C. W. HOLMES.
EGG TESTER.
APPLICATION FILED OCT. 6, 1916.

1,222,403.

Patented Apr. 10, 1917.

Witnesses

Inventor
C. W. Holmes.
By Victor J. Evans
Attorney

UNITED STATES PATENT OFFICE.

CHRIS W. HOLMES, OF STAPLES, MINNESOTA, ASSIGNOR OF ONE-HALF TO JOHN ALFRED LARSON, OF STAPLES, MINNESOTA.

EGG-TESTER.

1,222,403.  Specification of Letters Patent.  Patented Apr. 10, 1917.

Application filed October 6, 1916.  Serial No. 124,126.

*To all whom it may concern:*

Be it known that I, CHRIS W. HOLMES, a citizen of the United States, residing at Staples, in the county of Todd and State of Minnesota, have invented new and useful Improvements in Egg-Testers, of which the following is a specification.

This invention relates to egg testers and it consists in the novel features hereinafter described and claimed.

An object of the invention is to provide a tester of simple structure having means for completing an electric circuit to a lamp bulb when the eggs are placed in position upon the tester whereby the said bulb is illuminated and the contents of the egg shells may be observed to ascertain if the eggs are in proper condition for market or other purposes.

In the accompanying drawing:—

Figure 1:
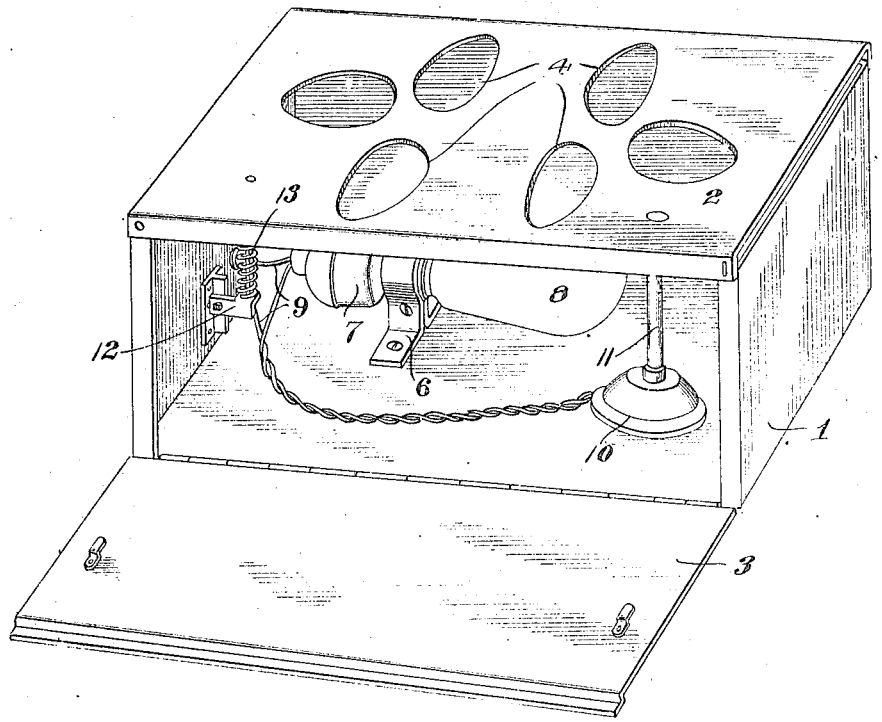
Figure 1 is a perspective view of the egg tester showing a side thereof in open position whereby the interior of the tester may be observed.
Figure 2:
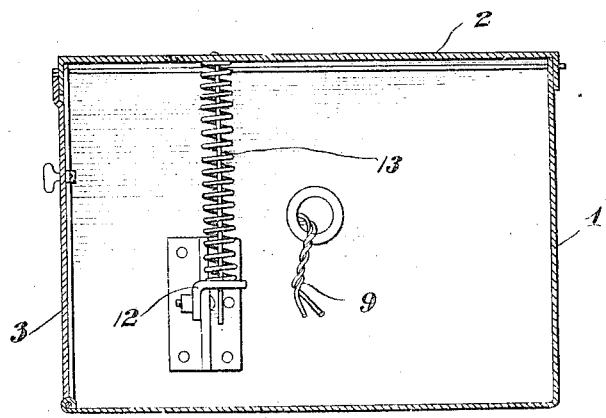
Fig. 2 is a transverse sectional view of the same.

The egg tester comprises a box 1 which is formed of tin or any other sheet metal and which is provided with a pivotally mounted top 2 and a hinged side 3. The top 2 is provided with a suitable number of apertures 4 upon which the eggs may be placed. A standard 6 is located within the box 1 and supports a socket member 7. A lamp bulb 8 is connected with the socket member 7 in the usual manner. Wires 9 lead into through the end of the box 1 and one of the said wires is connected with the socket member and the other wire is connected with a push button 10 located upon the bottom of the box and which is of the usual form of switch button. A post 11 depends from the top 2 and the lower end of the said post is just above the button 10. A bracket 12 is adjustably mounted at one end of the said box 1 and a spring 13 is interposed between the said bracket and the top 2 and is under tension with a tendency to hold the free edge portion of the said top elevated whereby the lower end of the post 11 is normally spaced from the said button 10.

When eggs are placed over the apertures 4 of the top 2 the weight of the said egg swings the top 2 in a downward direction whereby the lower end of the post 11 comes in contact with the push button 10 and closes the switch mechanism thereof whereby an electric circuit is completed along the wires 9 to the bulb 8 which is illuminated and inasmuch as the said bulb is housed in the box 1 the eggs are rendered partially transparent or translucent thus making it possible to observe the contents of the shell and to ascertain if the eggs are in proper condition for market or other purposes.

As soon as the eggs are removed from the top 2 the tension of the spring 13 comes into play whereby the free edge portion of the top is elevated and the lower end of the post 11 is moved away from the push button 10 and the said button thus operates under its spring whereby the switch is opened and the electric circuit to the lamp bulb is interrupted. Thus the lamp is extinguished and the current is cut off from the same automatically when the device is not being used for testing the eggs.

From the foregoing description taken in conjunction with the accompanying drawing, it will be seen that an egg tester of simple structure is provided, and that the same may be economically and advantageously used for ascertaining the condition of the contents of the egg shells and when not in use the device automatically assumes a condition which interrupts the electric current thus preventing the bulb from remaining illuminated when the device is not in use.

Having described the invention what is claimed is:—

An egg tester comprising a body having a hinged side and a pivotally mounted top provided with apertures, a bracket adjustably mounted in the body, a spring interposed between the bracket and the top and bearing loosely at its ends against the same, an electric light bulb located in the body, a button located in the body, said button and bulb being connected in open circuit with a source of electricity, and a post carried by the top and having its end normally spaced from the button.

In testimony whereof I affix my signature.

CHRIS W. HOLMES.